United States Patent [19]

Schlenk et al.

[11] Patent Number: 4,896,255
[45] Date of Patent: Jan. 23, 1990

[54] POWER PACK COMPRISING RESONANT CONVERTER

[75] Inventors: Manfred Schlenk, Augsburg; Edwin Hielscher, Oberursel/Stierstadt; Werner Loges, Maintal, all of Fed. Rep. of Germany

[73] Assignee: Siemens Aktiengesellschaft, Berlin and Munich, Fed. Rep. of Germany

[21] Appl. No.: 368,890

[22] Filed: Jun. 21, 1989

Related U.S. Application Data

[63] Continuation of Ser. No. 147,724, Jan. 25, 1988, abandoned.

[30] Foreign Application Priority Data

Jun. 5, 1987 [DE] Fed. Rep. of Germany ....... 3718960

[51] Int. Cl.$^4$ ......................................... H02M 7/539
[52] U.S. Cl. ..................................... 363/97; 363/16; 363/131
[58] Field of Search ....................... 363/16, 17, 25, 26, 363/97, 98, 131, 132, 134

[56] References Cited

U.S. PATENT DOCUMENTS

| | | | |
|---|---|---|---|
| 3,596,165 | 7/1971 | Andrews | 363/16 |
| 4,353,112 | 10/1982 | Rietveld et al. | 363/97 |
| 4,455,545 | 6/1984 | Shelly | 363/16 |
| 4,464,709 | 8/1984 | Barter | 363/98 |
| 4,535,399 | 8/1985 | Szepesi | 363/134 |
| 4,631,652 | 12/1986 | Wendt | 363/97 |
| 4,692,851 | 9/1987 | Attwood | 363/16 |
| 4,727,469 | 2/1988 | Kammiller | 363/132 |

OTHER PUBLICATIONS

"High Frequency Series Resonant Power Supply Design Review" by Patel and Adair in Unitrode Corporation SEM-300 Topic No. 5, pp. 5-1 to 5A-3, 1986.
"Schaltnetzteile" by Joachim Wustehube and Other Published by VDE-Verlag GmbH, pp. 28, 35, 1979.
"Taschenbuch Elektrotechnik" by Herausgeber E. Philippow, Band 1 Grundlagen VEB Berlag Technik, pp. 422-430, 2/1/68.
Article, "Design Aspects for High-Frequency Off--Line Quasi-Resonant Converters" by Jovanovic et al., HFPC, Apr. 1987, Proceedings, pp. 83-97.
Article, "Feedback Control of Zero-Voltage-Switching Resonant DC/DC Converters" by Kazimierczuk, HFPC, Apr. 1987, Proceedings pp. 98-114.
Article, A New High Frequency Converter Topology, by Jones et al., HFPC, Apr. 1987, Proceedings, pp. 211-221.
Article, HF-Resonant Bridge Converter by Borges et al., HFPC, May 1986, Proceedings, pp. 177-185.
Article by Dwight D. Jones, "A New Resonant Converter Topology", 48 HFPC, Apr. 1987, Proceedings, pp. 48-53.
Article, "The Cascode Switch in Series-Resonant Inverters" by Lafore et al., HFPC, Apr. 1987, Proceedings, pp. 71-82.
Article, "A High-Density Resonant Power Supply Using High-Voltage IC" by Ngo et al., HFPC of Apr. 1987, Proceedings, pp. 244-257.

Primary Examiner—Patrick R. Salce
Assistant Examiner—Jeffrey Sterrett
Attorney, Agent, or Firm—Hill, Van Santen, Steadman & Simpson

[57] ABSTRACT

A resonant circuit successively assumes charging and discharging conditions which form the primary circuit of a transformer in a power pack constructed according to the principle of a resonant converter, and a switch-over pulse is generated after each initiation of the charging condition and depending on the existance of current and/or voltage values for resonance in the resonant circuit, and the switch-over pulse ends the charging condition by using a switching means and initiates the discharging condition so as to produce an improved resonant converter.

12 Claims, 3 Drawing Sheets

IRES

USW

UC

UPW

POWER PACK COMPRISING RESONANT CONVERTER

This is a continuation of application Ser. No. 147,724, filed Jan. 25, 1988 now abandoned.

BACKGROUND OF THE INVENTION

1. Field of the Invention

This invention is directed to a method and to a circuit arrangement for the condition control of a resonant circuit which successively assumes a charging and a discharging condition which, in a power pack formed on the principle of a resonant converter, forms the primary circuit of a transformer which has its output voltage at the secondary side monitored by a regulating means which initiates the beginning of every charging condition dependening on the height of the output voltage at the secondary side.

2. Description of the Prior Art

In past years, electronic devices have become smaller, more compact and lighter in weight despite their increasing complexity. This development is largely based on the increasing utilization of integrated circuits. Only the power pack remains unaffected by this development since the volume and weight can only be reduced to an extremely slight degree using the traditional longitudinal regulator principle.

Significant advances in this respect could only be achieved by the constructing of the power pack as a switched power pack. As a result of the development of new components, particularly fast-switching transistors, it is presently possible to construct switched power packs which have high reliability and economic advantage. They are not only smaller and lighter but also have a higher efficiency than conventional power packs.

The principal of the switched power pack is essentially based on chopping an input DC voltage by using a fast switch, of transforming the rectangular voltage which is obtained with a transformer and again rectifying the output voltage of the transformer. The output voltage is stabilized with a control which either influences the pulse-duty factor or the frequency of the switching event.

As is known from the publication, "Schaltnetzteile", by Joachim Wuestehub et al, Expert Verlag 1979, such DC converters, based on their functional principle, operate either as a blocking oscillator converter, a forward converter or a push-pull converter.

The output power obtainable with these converters is principally limited only by the load which can be carried by the switching transistors.

The volume and weight of a switched power pack, however, are essentially determined by the inductive components which are thus relevant to the power density, ie. to the relationship between the maximum power that can be output and the structural size or the weight of the power pack.

In order to increase the power density, then the structural sizes of the inductances must be reduced and their efficiency must be retained. This, however, can only be achieved by increasing the switching frequency.

By merely increasing the switching frequency to above about 80 KHz results in a noticeable reduction of efficiency in a switched power pack. The reason for this is the extremely high rise rates of the currents and voltages in switched power packs operating in accord with traditional principles. Parasitic effects such as the skin effect also take effect at higher frequencies.

Further losses contributing to a reduction in the efficiency occur at the secondary side of the transformer due to the rectifier elements. Additional losses arise due to the great recovery charges and high reverse currents when rapid voltage and current changes occur.

The dissipated power occurring at higher frequencies, cause high-frequency and fast current and voltage changes which generate a large amount of radio interference which can be reduced to a reasonable degree only with complicated filters.

The fact that the occurring, fast voltage and current changes in traditional switched power packs place limits on an increase in the switching frequency resulted in a new principle of DC conversion which are referred to a resonant converters.

The publication of the Unitrode Company by R. Patel and R. Adair, "High Frequency Series Resonant Power Supply—Design Review," Unitrode Power Supply Design Seminar, Unitrode Publication No. SEM-300, Topic No. 5 discloses a power pack comprising a series resonant converter. The basic idea disclosed in this arrangement comprises a primary circuit of the transformer which is used therein as a LC resonant circuit. This is charged for a specific time as required and is subsequently discharged for the same time, whereby the charge and discharge times are specifically matched to the component parts employed such that the resonant condition for the series resonant circuit is met given nominal load of the secondary circuit.

As known, the complex resistance, ie. the reactive impedance of the circuit, is equal to zero resonance in the series resonant circuit. The current, also called resonance current, is in phase with the voltage of the resonant circuit and its amplitude reaches its maximum value which is limited only by the actual resistance of the series resonant circuit.

In more detail, when charging the resonant circuit, the current curve can be represented by a sine half-wave which, when the resonant circuit is discharged, is followed by a second sine half-wave having an opposite polarity, whereby a complete sine wave of the current occurs.

More detailed knowledge about such equalization and calculations are disclosed in the publications, such as, for example the Hand Book "Elektro Technik", Volume 1, Fundamentals 1968.

Fast current changes in the switched power pack are consequently avoided by using a series resonant circuit operated at resonance.

Considering the principal of a series resonant converter, such as the circuit arrangement shown in the afore-mentioned publication of the Unitrode Company, it is seen that the effective inductance of the series resonant circuit is composed of the inductance of the transformer at the primary side and of the inductance of a choke. This arrangement was selected in order to keep the influence of the inductance of the transformer dependent on the load of the secondary circuit as low as possible on the effective inductance of the series resonant circuit. To this end, the inductance of the choke must be as high as possible in comparison to that of the transformer. This, however, is opposed by the fact that the series connection of the choke and of the transformer is equivalent to an inductive voltage divider which makes the voltage available at the transformer dependent on the current and which causes decreases in efficiency due to the magnetization losses arising in the choke.

Since the inductance of the choke cannot be arbitrarily increased for the above reasons, the natural frequency in fact coincides with the constant drive frequency in a resonant circuit formed in this way only in a narrow range of the load of the transformer at the secondary side. When this narrow range which is usually designed as a nominal load range is left, asymmetrical over-voltages occur at the energy storage means and over-voltages occur at the switching elements. In order to protect these, the voltage must be limited at the capacitor of the resonant circuit with diodes, and a part of the transformable power is lost in the diodes. Further, intermittence of the resonant current occur outside the resonant point, and high losses in the switching elements occur as a result.

SUMMARY OF THE INVENTION

It is therefore an object of the invention to improve a resonant converter for power packs such that the resonant condition is met without efficiency losses even when the load changes at the secondary side.

This is object is inventively achieved by using a control means at the output of the transformer which controls the switching and charging and discharging times.

The current and/or voltage behavior in the resonant circuit is monitored in the method and the drive frequency is continuously maintined at the changing natural frequency on the basis of the information obtained. The resonant condition in the resonant circuit therefore always remains preserved and efficiency losses due to interruptions of the resonant current or due to over-voltages are avoided.

Also, a choke for the resonant circuit can be eliminated with the method, which results in an increase in efficiency.

Since the resonant condition is always obtained, the switch elements can be designed for lower power since they always switch at the zero-axis crossing of the resonant current. Protective measures against over-voltages at the switch elements are thus not necessary.

The drive frequency in the invention is synchronized with the natural frequency of the resonant circuit dependening on the zero-axis crossings of the resonant current. A deviation of the drive frequency from the natural frequency is minimal at every time and is determined only by the delay time from the recognition of a zero-axis crossing up to switching of the switching elements.

In a modified form, a control circuit which follows-up the drive frequency with reference to the changing current values is used instead of direct control.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
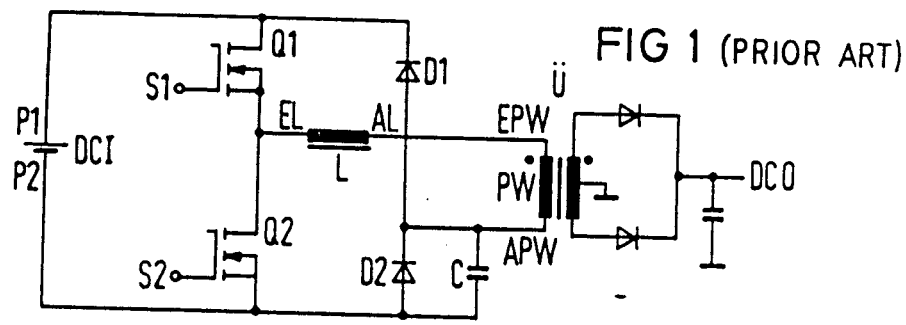
FIG. 1 is a circuit arrangement for the power stage of a power pack having a resonant converter of the prior art.

FIG. 1 shows a circuit arrangement for a power stage of a power pack comprising a resonant converter as known from the prior art. First and second switching transistors Q1 and Q2 are mounted in a circuit which has a choke L, a primary winding PW of a transformer U and a capacitor C. The input terminal EL to the choke L is connected to the positive pole P1 of a DC voltage source DCI through the first switching transistor Q1 and is connected to the negative pole P2 of the DC voltage source DCI through the second switching transistor Q2. The other terminal AL of the choke L is connected to an input terminal EPW of the primary winding PW of the transformer Ü and the other output terminal APW is connected to both the negative pole P2 of the DC voltage source DCI through the capacitor C and to the two poles P1 and P2 of the DC voltage source DCI through two protective diodes D1, D2 which are connected in the non-conducting direction. The secondary of the transformer Ü is connected to a standard rectifier for full-wave rectification and an output DC voltage DCO is obtained.

A control unit (not shown in FIG. 1) that monitors the output DC voltage DCO is connected to the control inputs S1, S2 of the two switching transistors Q1, Q2 which are in the non-conducting condition in the quiescent position.

When the control unit recognizes a drop of the output DC voltage DCO below a rated value, then it first supplies an input pulse to the control input S1 of the first switching transistor Q1 and, immediately thereafter, supplies an input pulse to the control input S2 of the second switching transistor Q2. This type of drive is repeated until the output DC voltage DCO has reached the rated value. All pulses of the control circuit have the same chronological length which is selected such that the resonant condition in the series circuit composed of the choke L, the primary winding PW of the transformer Ü and the capacitor C is met for a defined load of the transformer Ü at the secondary side.

Figure 2:
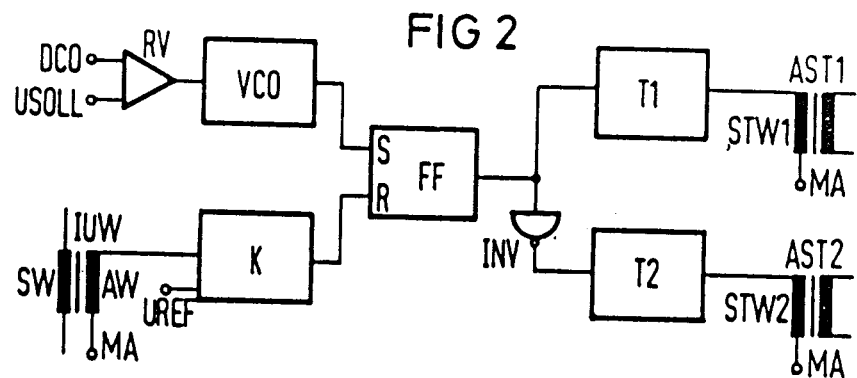
FIG. 2 is an arrangement for a control circuit having zero-axis current crossing recognition.

FIG. 2 shows a block circuit diagram of a control circuit of the invention for recognition of the zero-axis crossing of the current. It is formed of a RS flip-flop FF which has its input connected to a voltage-controlled oscillator VCO which is preceeded by a controlled-gain amplifier RV. A comparator K which is connected to a voltage-current transformer IUW is connected to the R input. The output of the control circuit is connected to two driver stages T1 and T2 which are each connected to flip-flop FF and to following drive transformers AST1 and AST2.

The input of the voltage-controlled oscillator VCO is connected to the output of the controlled-gain amplifier RV which has a first input which receives the output DC voltage DCO and has a second input which receives a rated value voltage USOLL. The output of the voltage-controlled oscillator VCO is connected to the S-input of the RS flip-flop. The current-voltage converter IUW is a transformer which has a high voltage ratio in favor of output winding AW. The current-voltage converter IUW has its current winding SW connected in series to the primary winding PW of the transformer Ü. The output winding AW of the current-voltage converter IUW has one end connected to an input of the comparator K and has its other end connected to a zero-volt potential MA of the secondary side. A second input of the comparator K comprises a reference voltage UREF. The output of the comparator K is connected to the R-input of the RS flip-flop FF. The output of this RS flip-flop FF is directly supplied to the first driver stage T1 and is supplied to the second driver stage T2 through an inverter INV. The outputs of the driver stages T1, T2 are respectively connected to the zero volt potential MA of the secondary side through control windings STW1, STW2 of drive transformers AST1, AST2.

The controlled-gain amplifier RV compares the output DC voltage DCO to the rated value voltage USOLL. When the output voltage DCO falls below the rated value USOLL, then a difference-dependent control voltage occurs at the output of the controlled-gain amplifier RV. The frequency of the output signal of the voltage-controlled oscillator VCO increases as the control voltage becomes higher.

With the assistance of the current-voltage converter IUW which is coupled to the transformer Ü, the comparator K monitors the current in the primary winding PW of the transformer Ü. The comparator K always starts its output at the zero-axis crossing of the current in the primary winding PW. With the driver stages T1, T2 and the associated drive transformers AST1, AST2 which are connected to transistors Q1 and Q2, the switching transistors Q1, Q2 shown in FIG. 1 are driven Transistors T1 and T2 operate out of phase with the control circuit of the invention, and are never simultaneously conducting or turned off. In the quiescent state, the output of the RS flip-flop FF has a digital L-level, which causes the second switching transistor Q2 to conduct and causes transistor Q1 to be turned off.

The control circuit of the invention causes the resonant condition in the primary circuit of the transformer. Starting with the quiescent condition of the control circuit, when the output DC voltage DCO falls below the rated value USOLL, then the voltage-controlled oscillator VCO is enabled. With the first pulse of the voltage-controlled oscillator VCO, the RS flip-flop FF is set and the first switching transistor Q1 becomes conductive through the driver stage T1 and the drive transformer AST1. The second switching transistor Q2 is driven to non-conudction. The primary circuit of the transformer U which is formed as a resonant circuit is connected to the DC voltage source DCI and energy is drawn for charging the resonant circuit. Energy will be transmitted to a user connected in the secondary circuit of the transformer Ü. Because the resonant circuit was designed so as to oscillate, the value of the current in the resonant circuit relative to time has a form of a half sine wave at the end when the current returns to zero. The comparator K recognizes this zero axis crossing and resets the RS flip-flop FF, whereupon the first switching transistor Q1 stops conducting and the second switching transistor Q2 becomes conducting. The resonant circuit is thus disconnected from the DC voltage source DCI and is shorted by the second switching transistor Q2. This results in discharging the resonant circuit and energy is supplied to the secondary circuit of the transformer Ü. During discharge, the current in the resonant circuit flows in a direction which is opposite t the direction of current which flowed while chargin the resonant circuit. The value of the current relative t time has the form of a half sine wave with a frequenc which corresponds to frequency that occured whe charging the resonant circuit. During charging an, discharging, the current in the resonant circuit thu comprises a complete sine wave which has a frequenc which is dependent on the load or the transformer Ü a the secondary side.

The operation of charging and discharging the resc nant circuit repeats depending upon the frequency c the voltage-controlled oscillator VCO or, respectivel) on how far the output DC voltage DCO is below th rated voltage USOLL.

The control circuit of the invention thus controls th switching transistors Q1 and Q2 at exactly the fre quency of the resonant circuit which determines it natural frequency. When the natural frequency of th resonant circuit changes due to a load change in th secondary circuit of the transformer Üthen the driv frequency changes also in the fashion set forth abov The resonant condition is thus always maintained in th resonant circuit for each and every load of the secon ary circuit.

Figure 3:
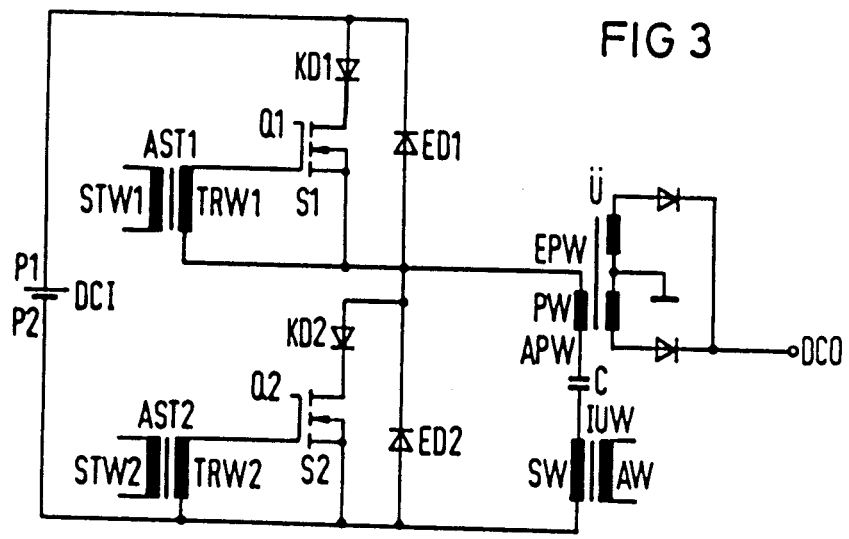
FIG. 3 is a circuit arrangement for a power stage of a power pack having a resonant converter.

FIG. 3 shows a circuit diagram for a power pac power stage based on the resonant converter princip: which is designed to be driven by the control circuit the invention. As compared to the circuit of the pow stage shown in FIG. 1, FIG. 3 shows the primary ci cuit of a transformer Ü formed as a resonant circu which does not have a choke L nor protective diod D1, D2 for the switching transistors Q1 and Q2. Th input EPW of the primary winding PW of the tran former Ü is connected through the source-drain path the first switching transistor Q1 (formed as a MOSFE7 to a compensation diode KD1 connected so as to co duct from the positive pole P1 of the DC voltage sourc DCI. The input EPW of the primary winding PW the transformer Ü is connected through an equivale diode ED1 poled in the non-conducting direction to tl positive pole P1 of the DC voltage source DCI. Tl first drive transformer AST1 has its driver windin TRW1 connected to the control input S1 of the fir switching transistor Q1 to the source input.

The input EPW of the primary winding PW of tl transformer U is connected through a second compe sation diode KD2 which is polarized in conductir direction through the drain-source path of the secor switching transistor Q2 which is formed as a a MO! FET to the negative pole P2 of the DC voltage sourc DCI. A second equivalent diode ED2 and the secor drive transformer AST2 is connected as shown ar corresponds to that of the first switching transistor Q The output APW of the primary winding PW of tl transformer Ü is likewise connected to the negati\ pole P2 of the DC voltage source DCI, through tl capacitor C and the current winding SW of the curren voltage converter IUW.

The current winding SW of the current-voltage co: verter IUW has negligible inductance, and for this re son the resonant circuit is formed only of the inductan of the transformer Ü and the capacitance of the capac tor C. The circuit of the switching transistors Q1, C for compensation and the equivalent diodes KD1, KD ED1, ED2 are required for high frequency because tl anti-parallel diode which is integrated in a MOSFET relatively slow and becomes ineffective at high freque cies. These integrated, anti-parallel diodes are respectively switched off with the compensation diodes KD1, KD2 and are replaced by the respective, very fast equivalent diodes ED1, ED2.

Figure 4A:
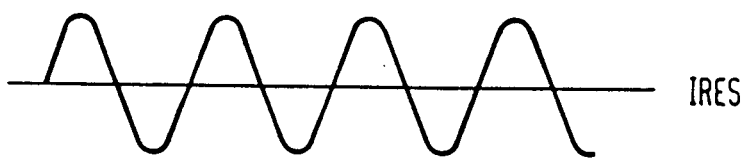
FIGS. 4A–4D are plots of currents and voltages occurring in the resonant circuit at the natural frequency as a function of time.
Figure 4B:
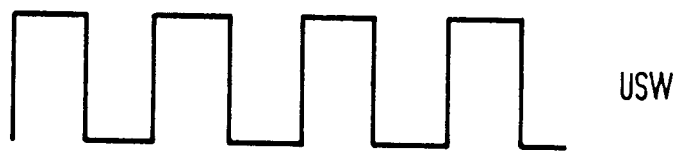
Figure 4C:
Figure 4D:
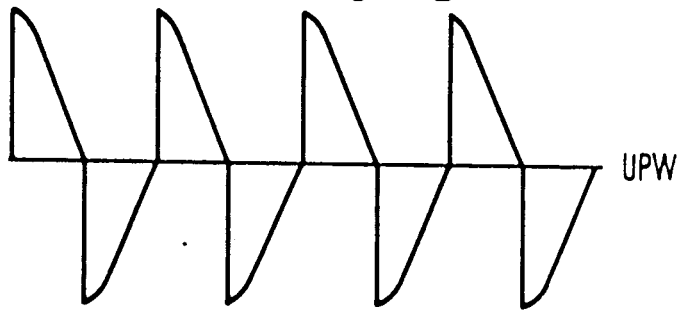

For a better understanding of the current and the voltage conditions in the resonant circuit refer to FIGS. 4A through 4D. FIG. 4A shows the time curve IRES of the resonant current. FIG. 4B shows the time curve USW. FIG. 4C shows the time curve UC. FIG. 4D shows the time curve UPW. These are voltages of the resonant circuit, across the capacitor C and across the primary winding PW of the transformer Ü for the case for maximum load at the secondary side. The rectangular-shaped total voltage USW shown in FIG. 4B in the resonant circuit is in phase with the sinusoidal resonant current IRES as shown. The charging of the resonant circuit during a positive sine half-wave and the discharging of the resonant circuit during a negative sine half-wave of the resonant current IRES is seen. The voltage UC across the capacitor C is sinusoidially and reaches its respective maximum valve between charging and discharging of the resonant circuit and returns to zero at the end of the discharging cycle. The voltage UPW across the primary winding PW of the transformer Ü jumps to its maximum positive value at the beginning of charging, then decreases sinusoidally, and jumps to its maximum negative value at the beginning of the discharging cycle and rises sinusoidally to its zero value which it assumes at the end of the charging cycle as shown in FIG. 4D.

An inventive control circuit which recognizes the maximum current in the primary circuit of the transformer Ü will be discussed below in greater detail.

With an object of producing the maximum efficiency of the power pack, the resonant condition must be met in the resonant circuit. According to the invention, the drive frequency must follow the natural frequency of the resonant circuit in order to meet the resonant condition. According to resonant circuit theory, the current in a resonant circuit which is left unmodified reaches its maximum exactly when the resonant circuit is driven at its natural frequency, ie. when resonance occurs. If the current in the resonant circuit cannot be further increased assuming a constant load at the secondary side, then it is certain that the drive frequency coincides with the natural frequency of the resonant circuit. It suffices to measure chronological mean values of the current and to correspondingly vary the drive frequency with a control circuit.

Figure 5:
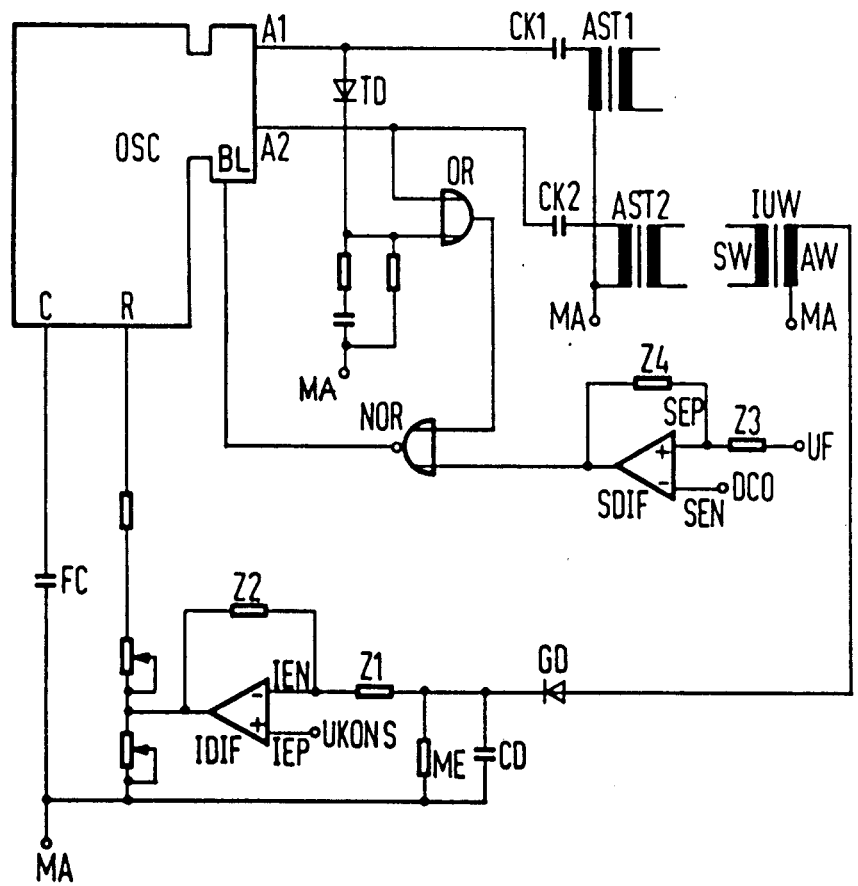
FIG. 5 is a circuit arrangement of a control circuit for recognizing the maximum current.

A control circuit which has its drive frequency at the natural frequency according to this method is shown in FIG. 5 which is a circuit diagram and may be used in combination with the power stage of FIG. 3.

The input of a variable oscillator OSC has a control complex for monitoring the current in the resonant circuit and monitors the output DC voltage DCO of the power pack allocated to it. At its output, the variable oscillator OSC is connected to the two drive transformers AST1, AST2 shown also in FIG. 3.

The variable oscillator OSC is provided for wiring an RC element and for determining its resonant frequency. A frequency capacitor FC is connected to the variable oscillator OSC's C-input and the other side of capacitor FC is connected to the zero volt potential MA of the secondary side. The R-input of the variable oscillator OSC is connected to the zero volt potential MA of the secondary side via a total of three series-connected resistors and the last two resistors are variable. The control complex which monitors the current in the resonant circuit is essentially formed by a differential amplifier IDIF which receives at its positive input IEP a constant voltage UKONS and the output of amplifier IDIF is connected to the junction point between the two series variable resistors.

The current-voltage converter IUW has its current winding SW inserted into the resonant circuit and has one end of its output winding AW connected to the zero volt potential MA of the output side and has the other end of winding AW connected to the input anode of a rectifier diode GD. The cathode output of the rectifier diode GD is connected to the zero volt potential MA of the secondary side through a parallel circuit comprising a precision resistor ME and a storage capacitor CD. The cathode output of the rectifier diode GD is also connected to the negative input IEN of the difference amplifier IDIF through a dropping resistor Z1. The output of the difference amplifier IDIF is connected to its negative input IEN through a feedback resistor Z2.

The control complex for monitoring the output DC voltage DCO is formed of a comparitor SDIF whose negative input SEN is the output DC voltage DCO and whose positive input SEP receives a fixed voltage UF through a dropping resistor Z3. A feedback resistor Z4 connects the positive input SEP of the comparator SDIF to the output. The output is connected to the first input of a NOR circuit. The output of the NOR circuit is connected to an inhibit input BL of the variable oscillator OSC.

Two separate drive outputs A1 and A2 of the variable oscillator OSC are respectively connected through coupling capacitors CK1 and CK2 to associated drive transformers AST1 and AST2 which respectively drive the switching transistors Q1 and Q2 shown in FIG. 3. The second drive output A2 of the variable oscillator OSC is directly connected to the first input of an OR circuit and the first drive output A1 of the variable oscillator OSC is connected to the second input of the OR circuit through the anode-cathode path of a separating diode TD. The second input of the OR circuit is connected to the zero volt potential MA of the secondary side, through a resistor and also through a series circuit comprising a resistor and a capacitor.

The control circuit maintains the drive frequency at the natural frequency of the resonant circuit in the following manner.

The current-voltage converter IUW allocates a proportional voltage value to the momentary value of the current in the resonant circuit. As a result of the rectifier diode GD, the precision resistor ME, and the storage capacitor CD, the output voltage of the current-voltage converter is rectified and a positive, time averaged voltage value is formed. The difference amplifier IDIF compares this voltage value to the value of the ajacent constant voltage UKONS. The resistance of the frequency-determining RC element of the variable oscillator OSC is influenced with the output of the difference amplifier IDIF. In the steady-state condition, the output of the difference amplifier IDIF is set such that the frequency of the drive outputs of the variable oscillator OSC which, of course, are the same as the drive frequency of the switching transistors Q1, Q2, coincides with the natural frequency of the resonant circuit. When the load in the secondary circuit of the transformer Ü changes, the natural frequency of the resonant circuit also changes, as is known, in a fashion such that the natural frequency assumes a higher value with an increase in load and the natural frequency assumes a lower value with a decrease in load.

When the load in the secondary circuit of the transformer Ü is reduced, then the current in the resonant circuit will assume a lower value. The difference amplifier IDIF will therefore produce a more positive value at its output which, as seen from the perspective of the variable oscillator OSC, represents an increase in resistance, and for this reason the variable oscillator OSC reduces the drive frequency of the switching transistors Q1 and Q2 in response thereto The time average value of the current in the resonant circuit will increase since the drive frequency now again approaches the natural frequency of the resonant circuit. The frequency-determining resistance of the variable oscillator OSC is further increased in a step-by-step manner by the difference amplifier IDIF until the drive frequency coincides with the natural frequency of the resonant circuit, i.e. the time average value of the current in the resonant circuit cannot be further increased by reducing the drive frequency. The dropping resistor Z1 and the feedback resistor Z2 connected to the difference amplifier IDIF serve to to match the control characteristics of the difference amplifier IDIF to the resonance characteristics or the resonant circuit.

In the case of load increase in the secondary circuit or the transformer Ü, the difference amplifier IDIF will cause a frequency-determining resistance decrease in steps for the variable oscillator OSC, which causes the variable oscillator OSC to increase its drive frequency until the time average value of the current can no longer be increased in the resonant circuit.

The control of the output DC voltage DCO of the power pack occurs due to the comparator SDIF. When the output DC voltage DCO exceeds the voltage determined by the dropping resistor Z3 and the feedback resistor Z4 and the fixed voltage UF, then the output of the comparator SDIF assumes a digital L-level. When digital L-levels occur at both inputs of the NOR circuit then the inhibit input BL of the variable oscillator OSC receives a digital H-level which then forces both drive outputs A1 and A2 to an electrical L-level which causes both switching transistors Q1 and Q2 to be in the nonconducting condition. So as to prevent both switching transistors Q1 and Q2 from being put into the non-conducting condition before the resonant circuit has been discharged by the switching transistor Q2, the drive outputs other with the OR circuit. This assures that a digital L-level at the output of the comparator SDIF does not take effect until the resonant circuit has been completely discharged by the second switching transistor Q2.

The drive of the two digital switching transistors Q1, and Q2 successively occur due to a respective digital H-level in the form of a positive rectangular pulse. So as to make sure that the second switching transistor Q2 does not conduct until the first switching transistor Q1 has turned off, a brief switching pause occurs between the two drive pulses. This can cause a premature digital L-level at the comparator output. So as to prevent this, the output of the OR circuit is held at a digital H-level due to RC combination located at the second input of the OR circuit which cause the switching pause to occur between the two drive pulses.

Although the invention has been described with respect to preferred embodiments, it is not to be so limited as changes and modifications can be made which are within the full intended scope of the invention as defined by the appended claims.

We claim as our invention:

1. A method for controlling a resonant circuit which respectively successively assumes charging and discharging conditions and which forms the primary circuit of a transformer in a power pack constructed according to the principal of a resonant converter, and the output voltage of the secondary side of said transformer is monitored by a control means which initiates the beginning of each charging cycle depending on the height of the output voltage at said secondary side, comprising the steps of generating after every imitation of the charging condition, a switch-over pulse which depends on the existance of current and/or voltage values corresponding to resonance in the resonant circuit and said switch-over pulse terminating the charging condition at a time that causes the generation of a true resonance in the resonant circuit by using a switching means, and then immediately initiating the discharging condition which is maintained at least as long as the time of the charging condition.

2. A method according to claim 1, comprising generating the switch-over pulse when the current occurring in the resonant circuit is zero.

3. A method for controlling a resonant circuit which respectively successively assumes charging and discharging conditions and which forms the primary circuit of a transformer in a power pack constructed according to the principal of a resonant converter, and the output voltage of the secondary side of said transformer is monitored by a control means which initiates the beginning of each charging cycle depending on the height of the output voltage at said secondary side, comprising the steps of generating after every initiation of the charging condition, a switch-over pulse which depends on the existence of current and/or voltage values corresponding to resonance in the resonant circuit and said switch-over pulse terminating the charging condition using a switching means and initiating the discharging condition which is maintained at least as long as the time of the charging condition, and comprising storing the time of the current charging condition, comparing a momentary time averaged value of the current occurring in the resonant circuit with a average reference value and adjusting the time duration of following charging conditions by shortening or, lengthening them until no increase of the compared values can be detected.

4. A circuit for controlling a resonant circuit which is successively charged and discharged and which forms the primary circuit of a transformer in a power pack, comprising, a transformer (Ü), a capacitor (C) connected in the primary circuit of said transformer, switch means closing the primary circuit through or bypassing a DC voltage source (DCI), a by-stable flip-flop with its input connected to an output of a current zero value generator associated to the primary circuit and to an output of a frequency generator which depends on an output voltage (DCO) at the secondary side of said transformer (Ü); and the output of said by-stable flip-flop is connected to the switch means through a coupling means.

5. A circuit according to claim 4, wherein said current zero value generator is formed of a current-voltage converter (IUW) which has its current winding (SW) connected in the primary circuit and which has its output winding (AW) connected to a first input of a comparator (K), and the second input of said comparator receives a reference voltage (UREF).

6. A circuit according to claim 4 or claim 5, wherein said frequency generator is a voltage-dependent oscillator (VCO) which has its input connected to the output of a difference amplifier (RV) which has its input connected to the output voltage (DCO) of the secondary side and to a rated value voltage (USOLL).

7. A circuit arrangement according to claims 4 or 5 wherein said switch means are formed by two switching transistors (Q1,Q2); said coupling means are each composed of a driver stage (T1, T2) comprising drive transformers (AST1, AST2) each associated to a respective switching transistor (Q1, Q2), and the driver winding (STW1, STW2) of said drive transformers are connected to control inputs (S1, S2) of the associated switching transistor (Q1, Q2); and the input of one of said driver stages (T1, T2) is preceded by an inverter (INV).

8. Circuit arrangement according to claim 4 or 5 characterized in that only the inductivity of the transformer U is provided as the resonant circuit relevant inductivity in the primary circuit.

9. A controlled loop circuit arrangement for controlling a resonant circuit which is successively charged and discharged and which forms the primary circuit of a transformer in a power pack comprising, a transformer (U), a capacitor (C) connected in the primary circuit of said transformer, switch means for closing the primary circuit through or bypassing a DC voltage source (DCE), a frequency generator which receives an input for varying its output frequency comprising a control output voltage from a control arrangement that compares average values of the current in said primary circuit; said frequency generator has its output connected to coupling means which are connected to said switch means; and said frequency generator has an inhibit input which is connected to an output of a control circuit which compares an output voltage (DCO) at the secondary of said transformer (U) to a fixed value voltage (UP).

10. A circuit according to claim 9, wherein said control arrangement is formed of a current-voltage converter (IUW) which has a current winding (SW) connected in said primary circuit and which has its output winding (AW) connected through a rectifier to the first input of a difference amplifier (IDIF) formed as a control means, a second input of said difference amplifier which receives a constant voltage (UKONS).

11. A circuit according to claim 9 or 10, wherein said frequency generator is a variable frequency oscillator (OSC) which has two drive outputs (A1 and A2) which are controlled with an inhibit input (BL); said switch means are formed by two switching transistors (Q1 and Q2); said coupling means are each formed of a coupling capacitor (CK1, CK2) associated with a switching transistor (Q1, Q2) and a drive transformer AST1, AST2 which have their driver windings (STW1, STW2) connected to a control input (S1, S2) of said associated switching transistor (Q1, Q2).

12. A circuit according to claim 9 and wherein said inhibit input is produced by a logic arrangement which receives at its inputs the output of the control circuit and the drive outputs (A1, A2) of the variable oscillator.

* * * * *